United States Patent [19]
Mashiki et al.

[11] 4,269,533
[45] May 26, 1981

[54] SPACER

[75] Inventors: Nobuo Mashiki, Tokyo; Koichi Chigusa, Imizu, both of Japan

[73] Assignee: Aisin Seiki Kabushiki Kaisha, Kariya, Japan

[21] Appl. No.: 946,427

[22] Filed: Sep. 27, 1978

[30] Foreign Application Priority Data

Sep. 30, 1977 [JP] Japan .............................. 52-132553

[51] Int. Cl.³ .......................... F04B 39/00; F16D 1/06
[52] U.S. Cl. ...................................... 403/410; 52/738
[58] Field of Search ......................... 52/720, 731, 738; D25/74, 76; 403/410

[56] References Cited
U.S. PATENT DOCUMENTS

| | | | |
|---|---|---|---|
| D. 210,286 | 2/1968 | Venema | D25/76 X |
| 1,290,740 | 1/1919 | Hale | D25/76 X |
| 3,396,499 | 8/1968 | Biffani | 52/720 X |
| 3,520,663 | 7/1970 | Schertel | 52/738 X |
| 3,881,294 | 5/1975 | Biebuyck | 52/738 X |
| 4,142,343 | 3/1979 | Trafton | 256/59 X |

*Primary Examiner*—Werner H. Schroeder
*Attorney, Agent, or Firm*—Finnegan, Henderson, Farabow, Garrett & Dunner

[57] ABSTRACT

A hollow spacer for securely separating two mutually attached members at a selectable distance, the distance based on the length of a spacer transversely sliced from an elongated, hollow, extruded body. The spacer has a polygonal transverse cross-section and a plurality of partially open channels or bolt-receiving recesses extending substantially parallel to the longitudinal axis of the extruded body.

1 Claim, 9 Drawing Figures

4,269,533

SPACER

FIELD OF THE INVENTION

This invention relates to a spacer for securely separating two mutually attached members at a given distance from each other. In particular, the invention relates to a lightweight spacer sliced from an elongated, extruded body having a uniform transverse cross-section.

BACKGROUND OF THE INVENTION

Conventional spacers have a hollow body having a substantially square transverse cross-section. Generally, the body is provided with four holes, at its four corners, through which bolts are passed to mutually secure the members separated by the spacer. The holes are in the wall of the body and are not open to the central hollow portion or the exterior of the body.

Because the conventional spacer is usually made by die casting aluminum, the inner and outer surfaces of the body are tapered adding unnecessary weight to the center portion of the body. Additional unnecessary weight is present in conventional spacers in the form of protrusions inwardly extending from the inner surface of the walls of the body which are necessary to facilitate extraction of the body from the die.

Mass production makes the individual die casting of spacers impractical. A more efficient manner of mass producing spacers having identical cross-sections but different lengths is by extrusion. Conventional spacers however, are difficult to extrude because of their complicated cross-sectional structure. In particular, the four bolt holes are separated and independent from each other and the central hollow portion. Such a spacer having five individual hollow portions is difficult to make by extrusion because the pitch of each of the five hollow portions will vary during the extrusion process.

In order to mass produce spacers by the more efficient extrusion process, therefore, it is necessary to simplify the cross sectional structure of the spacers. The instant invention provides a spacer having a simplified cross section capable of being extruded, thereby permitting mass production of the spacers through extrusion and reducing the weight of the spacers by eliminating unnecessary structure.

SUMMARY OF THE INVENTION

In accordance with the invention, as broadly described and claimed herein, a spacer is provided for securely separating members mutually attached by means passing through the spacer including a hollow polygonal body having at least three enclosed sides and being open at two opposed sides and a plurality of partially open channel means being spaced about and recessed into the enclosed sides for permitting passage between the open sides of the means for mutually attaching the members.

Preferably the spacer has four enclosed sides and a rectangular cross-section, although it may have a cross-section substantially rhombic in shape.

The partially open channel means are preferably channels formed into the enclosed sides at the intersecting corners with all four channels being open to the interior hollow portion of the spacer, with all four channels being open to the exterior of the spacer, or with two opposed channels being open to the interior of the spacer and the other two opposed channels being open to the exterior of the spacer.

Also in accordance with the invention, there is provided an elongated extrusion transversely divisible into a plurality of spacers, each for securely separating mutually attached members, having a hollow, elongated body, with at least three walls having a polygonal transverse cross section and a plurality of partially opened elongated channels recessed into the walls at the intersecting corners of the extrusion, the channels being substantially parallel to the longitudinal axis of the body.

Further in accordance with the invention, a method of manufacturing spacers for securely separating mutually attached members is provided which comprises the steps of extruding a billet of metal around a core bar and through a die to produce an elongated, hollow body with a polygonal cross section having a plurality of partially open, elongated channels recessed in and spaced about the walls of said body, and transversely cutting the elongated body into individual spacers having selectable lengths.

It is the principal object of the instant invention to provide an improved spacer having a simplified cross-sectional structure which may be extruded in a single elongated body from which spacers may be obtained in selectable lengths.

A further object of the invention is to provide a spacer which is light in weight and inexpensive to mass produce.

DESCRIPTION OF THE PREFERRED EMBODIMENTS

Figure 1:
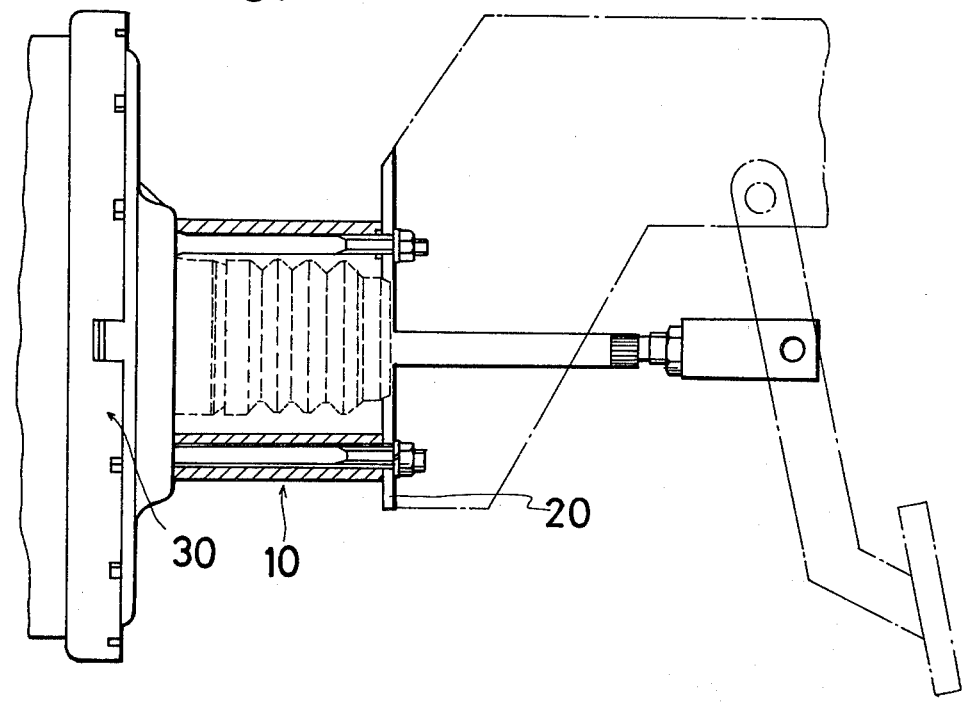
FIG. 1 is a partially longitudinal cross-sectional view of an illustration of a spacer interposed between a dashboard and a brake booster.
Figure 2:
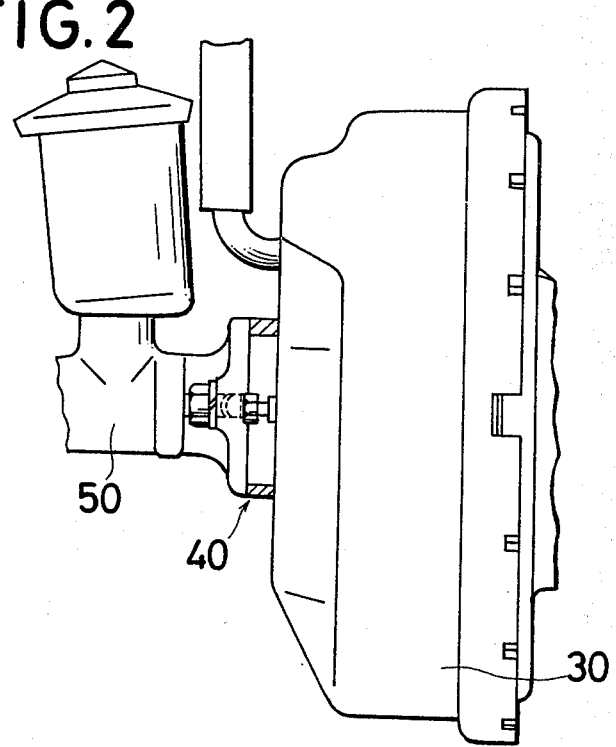
FIG. 2 is a partially longitudinal cross-sectional view of an illustration of a spacer interposed between a brake booster and a brake master cylinder.
Figure 3:
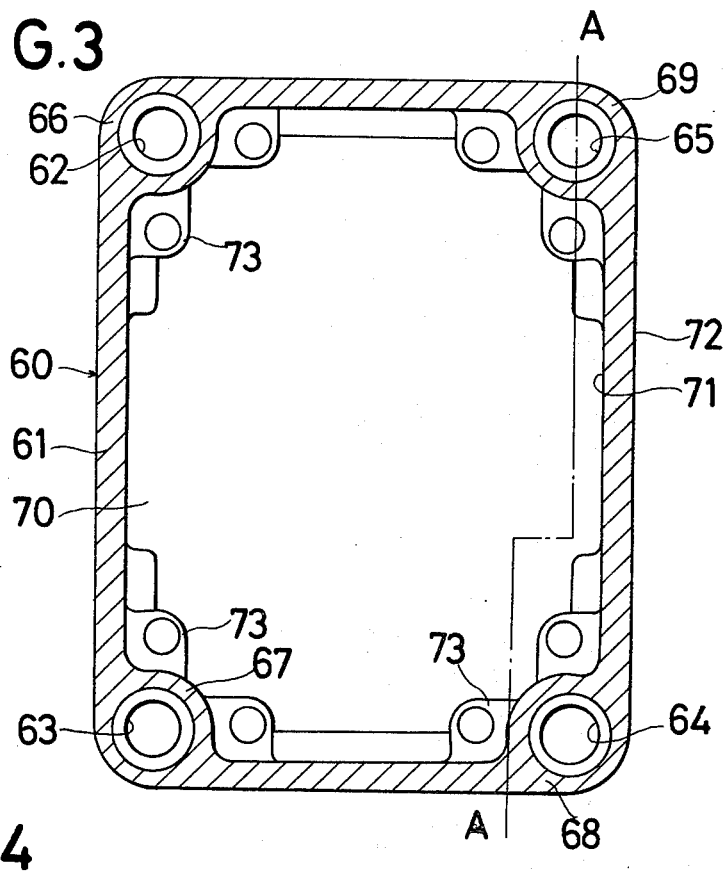
FIG. 3 is a transverse cross-sectional view of a conventional, prior art spacer.
Figure 4:
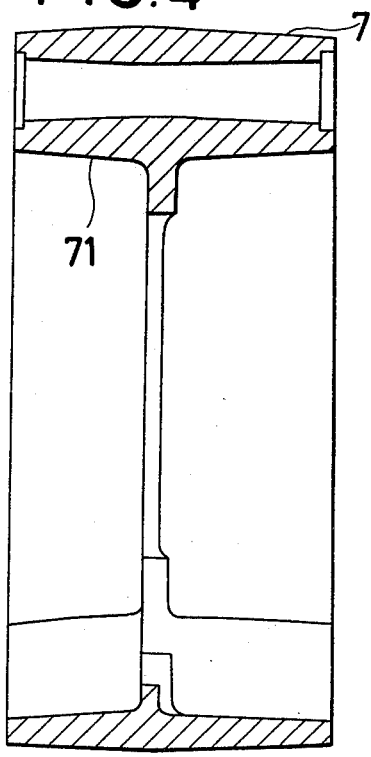
FIG. 4 is a sectional view, taken along line A—A, of FIG. 3.

Spacers 10 and 40 depicted in FIGS. 1 and 2 are examples of the use of spacers to securely separate the car dashboard from the brake booster and the brake booster from the brake cylinder, respectively. Conventional spacers have a cross-section substantially as shown in FIG. 3. FIG. 3 clearly depicts the five separate hollow spaces, bolt holes 62, 63, 64, 65 and central hollow portion 70 which would be very difficult to extrude with uniformity. Further, protrusions 73, necessary to extract the conventional spacer from the die, depicts the additional unnecessary structure of conventional spacers. FIG. 4 depicts the tapering of the walls of die cast conventional spacers which also adds additional unnecessary weight to the conventional spacer.

In accordance with the invention, a spacer for securely separating members mutually attached by means passing through the spacer comprises a hollow polygonal body having at least three enclosed sides and being open at two opposed sides, and a plurality of partially open channel means being spaced about and recessed into the enclosed sides for permitting passage between the open sides of the means for mutually attaching the members.

Figure 5:
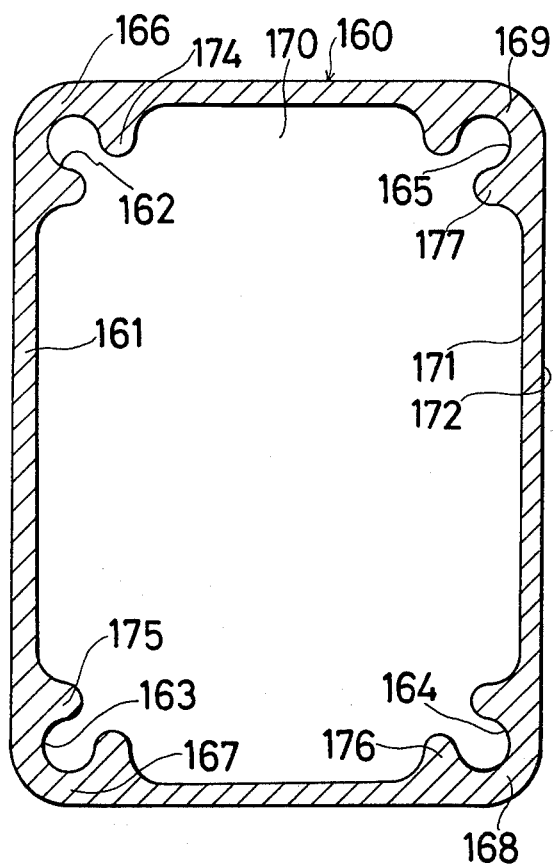
FIG. 5 is a transverse cross-sectional view of an embodiment of the spacer according to this invention.

In the first embodiment, as seen in FIG. 5, a spacer 160 has a body 161 sliced from an elongated, extruded body, having a substantially square transverse cross-section and a central hollow portion 170. At each of the four corners 166, 167, 168 and 169 of the body 161, a pair of substantially parallel inward projections 174, 175, 176 and 177 are provided on the inner surface 171 of the body 161. The space between the projections 174, 175, 176 and 177 forms bolt-passing portions or channels 162, 163, 164 and 165, which are recessed into the inner surface 171 and are open to the central hollow portion 170. Thus, the channels 162, 163, 164 and 165 and the central hollow portion, 170, in essence, form a single expanded hollow portion in the body 161.

Figure 8:
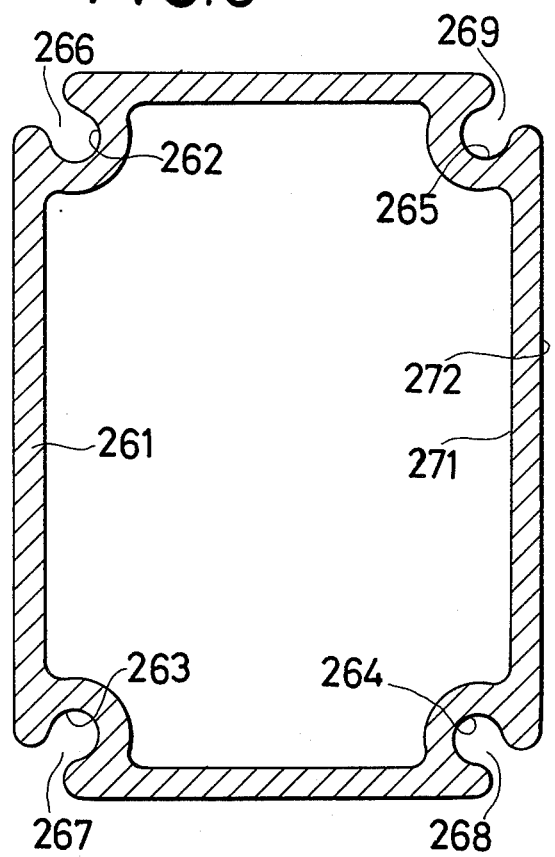
FIG. 8 is a transverse cross-sectional view of another embodiment of the spacer in accordance with this invention.

In another embodiment, as seen in FIG. 8, an inner projection 274, 275, 276 and 277 is provided in the inner surface 271 of the body 261 at each of the four corners 266, 267, 268 and 269, respectively. The four inner projections 274, 275, 276 and 277 provide recesses in the outer surface 272 of the body 261 forming bolt passing portions or channels 262, 263, 264 and 265 having substantially C-shaped transverse cross-sections at the four corners 266, 267, 268 and 269, respectively, which are partially open to the exterior of the body 261.

Figure 9:
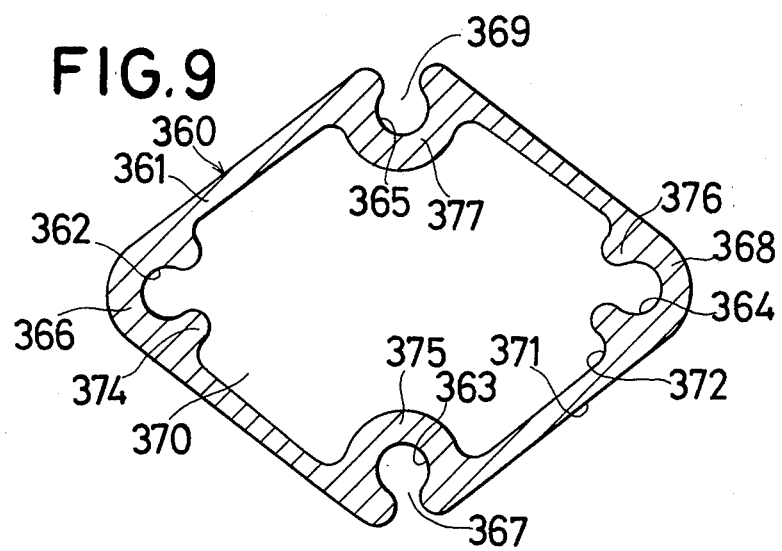
FIG. 9 is a transverse cross-sectional view of still another embodiment of the spacer in accordance with this invention.

A third embodiment is depicted in FIG. 9 wherein the body 361 of the spacer 360 is substantially rhomboid in transverse cross section. In this embodiment, two opposed corners 366 and 368 are each provided with a pair of inner projections 374 and 376, respectively, similar to those in FIG. 5. Bolt-passing means or channels 362 and 364 are recessed into the inner surface 372 of the walls 361 of the body 360 between the projections 374 and 376, respectively. The bolt-passing portions or channels at these corners 366 and 368 are open to the inner, hollow portion 370 of the body 360.

At the other two opposed corners 367 and 369 of the embodiment in FIG. 9, the walls 361 have inner projections 375 and 377, respectively, similar to those in FIG. 8. Bolt-passing portions or channels 363 and 365, respectively, are recessed into the outer surface 371 of the walls at these corners 367, 369. These bolt-passing portions or channels 363 and 365 are open to the exterior of the body 360.

In accordance with the invention, a method of manufacturing spacers for securely separating mutually attached members comprises extruding a billet of metal around a core bar and through a die to produce an elongated hollow body with a polygonal cross-section having a plurality of partially open, elongated channels recessed in and spaced about the walls of the body, and transversely cutting the elongated body into individual spacers having selectable lengths.

Figure 6:
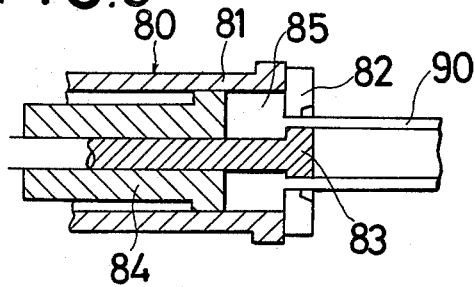
FIG. 6 is a partially schematic, vertical section view of an extrusion apparatus for manufacturing the spacer of this invention.
Figure 7:
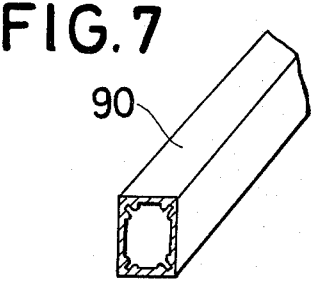
FIG. 7 is a perspective view of an extruded body of this invention before being cut into spacers.

As here embodied, and as seen in FIGS. 6 and 7, an extruding machine 80 is used to produce an elongated extrusion 90 transversely divisible into a plurality of spacers. The extruding machine 80 includes a container 81, a die 82 provided at one open end of the container 81, a core bar 83 one end of which is fixed and the other end of which is located at the open end of the die 82, and a plunger 84 movably fitted within the container 81. A billet of metal 85 is placed in the container 81 between the plunger 84 and the die 82. When the plunger 84 is moved to extrude the billet 85, a continuous elongated body 90 with a central hollow portion defined by the core bar 83 and die 82 is extruded from the machine 80. The spacers having uniform cross-sections are formed by transversely cutting the continuous body 90 to a given length.

The embodiment depicted in FIG. 5 is easily formed by extrusion because it has a single central hollow portion. This is to be distinguished from an effort to obtain, by extrusion, a continuous body with a plurality of independent hollow portions. In such a situation, it would be necessary to provide separate core bars for each hollow portion. It is, however, difficult to provide a plurality of core bars in an extruding machine 80 because the pitch between these core bars will vary during the process of extrusion thus preventing manufacture of an elongated body 90 having a uniform transverse cross section. In the instant invention, an extrusion of the elongated body is accomplished with the use of a single core bar.

The embodiment of the spacer depicted in FIG. 8 is also easily manufactured by extrusion. In the manufacture of this embodiment it is only necessary to alter the shape of core bar 83 and the opening of the die 82. Similarly, the embodiment depicted in FIG. 9 may be manufactured by using the extrusion machine of FIG. 6 merely by altering the shape of the core bar 83 and the opening in the die 82.

The invention, therefore, provides a spacer for securely separating two mutually attached members having a simplified structural cross-section and provides a method for extruding the spacers in a single continuous elongated body from which the spacers may be sliced in selectable lengths.

It will be apparent to those skilled in the art that various modifications and variations could be made in the spacers of this invention and the method of manufacture, without departing from the scope or spirit of the invention.

What is claimed is:

1. A spacer for securely separating members mutually attached by means passing through the spacer, comprising:
    (a) a one-piece, hollow body having four integrally formed walls open at two opposed ends and having a substantially rectangular cross section; and
    (b) a pair of substantially parallel inward projections formed in the interior of said walls at each corner of said body forming a channel partially opened to the interior of said hollow body at each corner of said body, the interior of said body being free of any further structure, and said body being capable of manufacture by extrusion.

* * * * *